United States Patent [19]
Morita et al.

[11] Patent Number: 4,651,692
[45] Date of Patent: Mar. 24, 1987

[54] STRUCTURE OF DIVIDED COMBUSTION CHAMBER FOR DIESEL ENGINE

[75] Inventors: Tetuya Morita; Akinori Wakasa, both of Aki; Yutaka Ogawa; Takayuki Ogasawara, both of Nagoya, all of Japan

[73] Assignee: NGK Insulators, Ltd., Japan

[21] Appl. No.: 814,978

[22] Filed: Dec. 31, 1985

Related U.S. Application Data

[62] Division of Ser. No. 658,884, Oct. 9, 1984, Pat. No. 4,577,600.

[30] Foreign Application Priority Data

Oct. 6, 1983 [JP] Japan .............................. 58-155875
Oct. 6, 1983 [JP] Japan .............................. 58-155876

[51] Int. Cl.$^4$ ............................................. F02B 3/00
[52] U.S. Cl. ....................................... 123/270; 123/271
[58] Field of Search ............................... 123/270, 271

[56] References Cited

U.S. PATENT DOCUMENTS

| | | | |
|---|---|---|---|
| 2,243,846 | 6/1941 | Hofstetter | 123/270 |
| 3,140,697 | 7/1964 | Peras | 123/270 |
| 4,300,497 | 11/1981 | Webber | 123/270 |
| 4,426,966 | 1/1984 | Huther et al. | 123/270 |
| 4,522,171 | 6/1985 | Dworak | 123/270 |

FOREIGN PATENT DOCUMENTS

| | | | |
|---|---|---|---|
| 943560 | 7/1949 | Fed. Rep. of Germany | 123/270 |
| 1102474 | 3/1961 | Fed. Rep. of Germany | 123/270 |
| 1751606 | 8/1971 | Fed. Rep. of Germany | 123/270 |
| 2550885 | 5/1977 | Fed. Rep. of Germany | 123/270 |
| 2919743 | 11/1980 | Fed. Rep. of Germany | 123/270 |
| 770900 | 9/1934 | France | 123/270 |
| 440461 | 12/1935 | United Kingdom | 123/270 |
| 901983 | 7/1962 | United Kingdom | 123/270 |

Primary Examiner—Ronald B. Cox
Attorney, Agent, or Firm—Parkhurst & Oliff

[57] ABSTRACT

Herein disclosed is a structure of a divided combustion chamber or a pre-combustion chamber of a Diesel engine of the type, in which the divided combustion chamber is composed of an upper ceramic member having a substantially hemispherical head and a lower ceramic member having an injection port. Either one or both of the upper and lower ceramic members is/are formed with longitudinally and/or transversely extending cut or cuts, slit or slits, and/or groove or grooves at least a portion of the outer surface or surfaces of one or two of those ceramic members. Thus, the resistance of the ceramic members to any rupture is improved so that the divided combustion chamber made of ceramic has highly improved durability.

7 Claims, 28 Drawing Figures

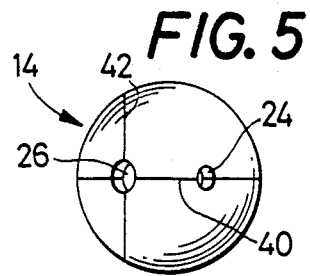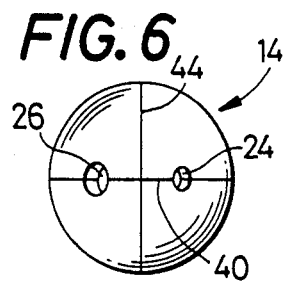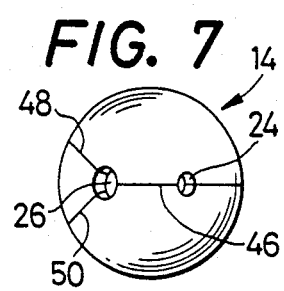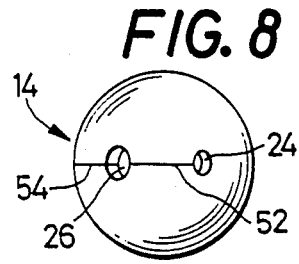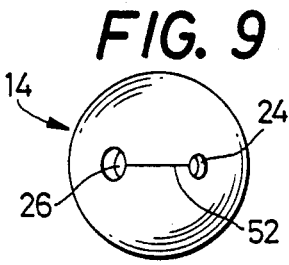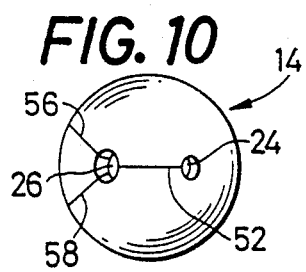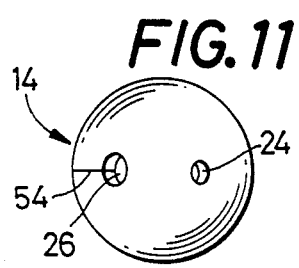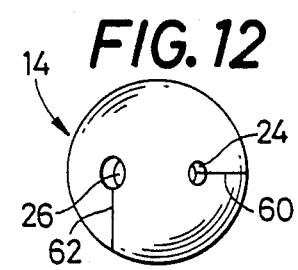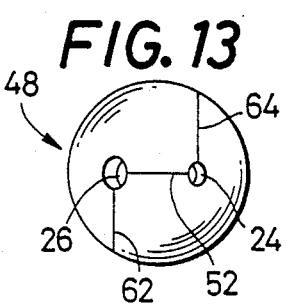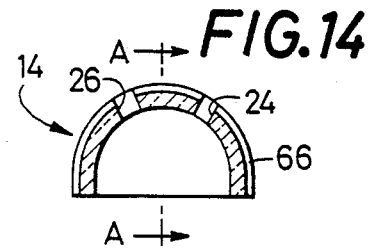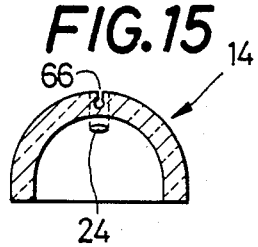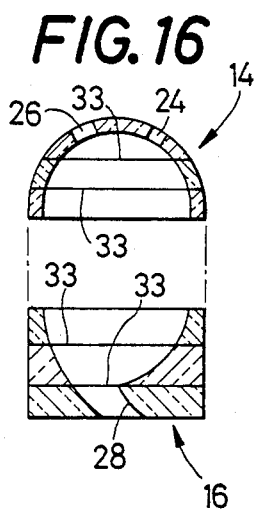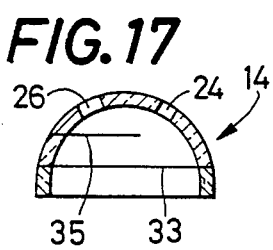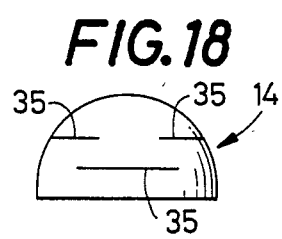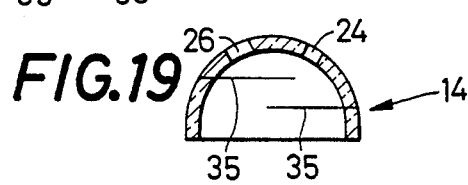

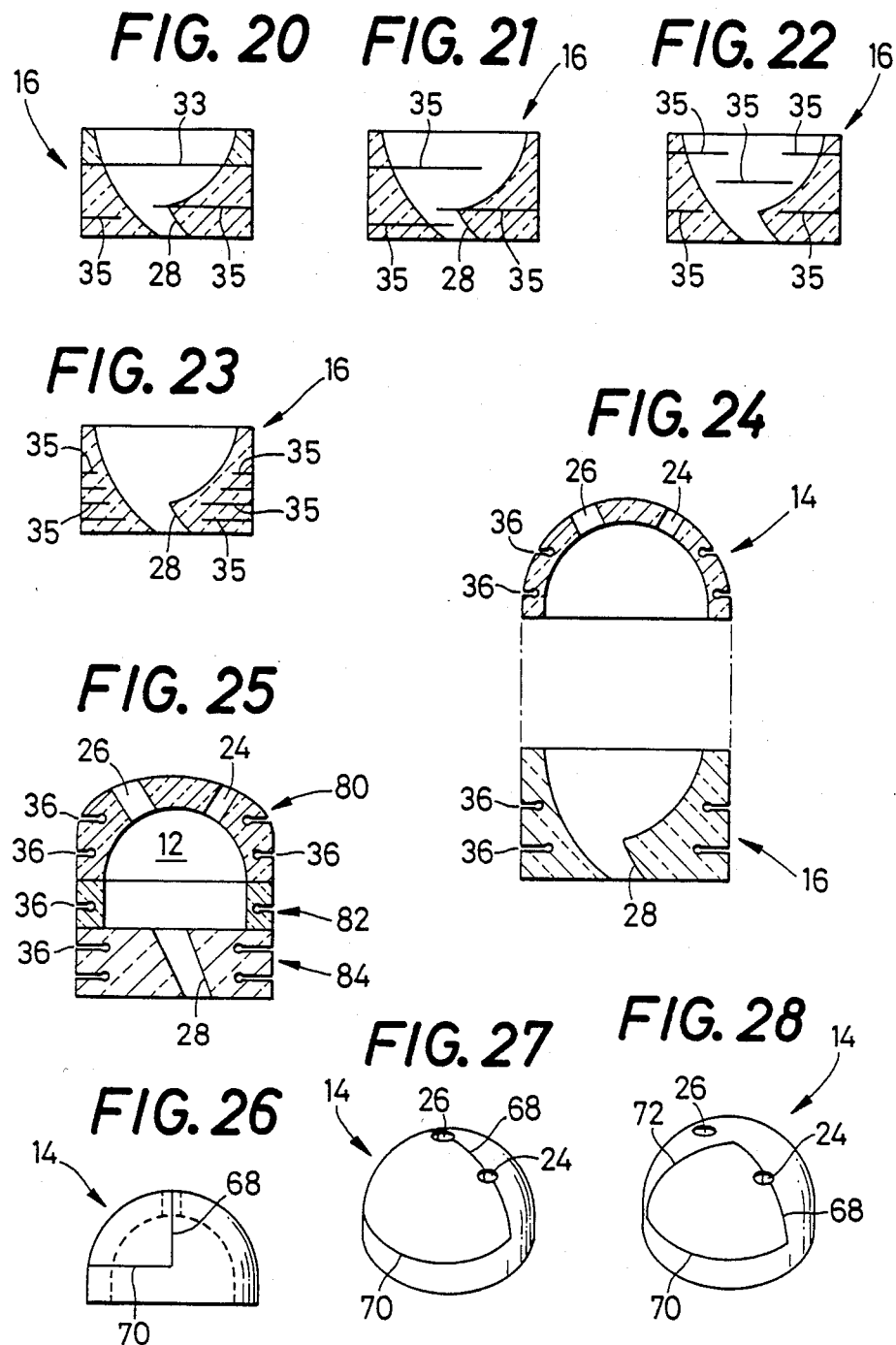

STRUCTURE OF DIVIDED COMBUSTION CHAMBER FOR DIESEL ENGINE

This is a division of application Ser. No. 658,884, filed Oct. 9, 1984, now U.S. Pat. No. 4,577,600.

BACKGROUND OF THE INVENTION

1. Field of the Invention

The present invention relates to a structure of a divided combustion chamber for a Diesel engine and, more particularly, to a structure of a divided combustion chamber of a Diesel engine, which structure is made of ceramics to have improved thermal efficiency and durability.

2. Description of the Prior Art

There have been made heretofore a number of trials in which a structure defining a divided combustion chamber, e.g., a swirl chamber of the Diesel engine is made of ceramics. Especially in order to improve the durability of the cup of the swirl chamber formed with an injection port, a variety of ceramics such as silicon carbide or silicon nitride have been tested because of their excellent heat resistances and high strengths. To improve a mileage or fuel consumption and a thermal efficiency, there have been made in recent years trials in which the swirl chamber described above is wholly made of ceramics so that the temperature of the combustion gas in the swirl chamber may be elevated by making use of the heat insulation of the ceramics.

Since ceramics are a brittle material, however, such a place, e.g., the aforementioned swirl chamber as is subject to remarkably severe thermal conditions is liable to be frequently ruptured by a thermal shock or stress even if the strength of the ceramics is raised to a high level by the recent technical progress.

When the structure forming the swirl chamber is wholly made of ceramics, an inner wall defining the swirl chamber is exposed to a high temperature for a very short time due to the combustion heat which is generated in the swirl chamber. On the contrary, the outer wall portion of ceramics forming the swirl chamber is held in close contact with the cylinder heat or is in indirect contact with the same through air gaps, a heat insulating material or the like, so that its temperature is held low. This results in a remarkably large temperature difference in the direction of thickness of the ceramics forming the swirl chamber (i.e., the divided combustion chamber) so that a compressive stress is exerted upon the inner surface (i.e., that of the swirl chamber) whereas a tensile stress is exerted upon the outer surface.

Generally speaking, ceramics have a high compressive rupture strength but a low resistance to the tensile stress. As a result, when the aforementioned excessive tensile force is applied to the outer surface of the divided combustion chamber made of ceramics, cracks occur in a portion of the outer surface, and the ceramic begins to rupture. This is a major cause for reducing the durability of the divided combustion chamber.

SUMMARY OF THE INVENTION

The present invention has been conceived in view of the background thus far described and has an object to provide a divided combustion chamber of ceramics, which overcomes the weakness of the ceramics against a tensile force, and is given a high resistance to rupture.

In order to achieve the above-specified object, the present invention provides an improved structure of a divided combustion chamber in a Diesel engine, wherein the divided combustion chamber is defined by an upper ceramic member having a substantially hemispherical head and a lower ceramic member having an injection port, which lower ceramic member is combined with the upper ceramic member to form the chamber therein, the upper ceramic member having at least one of a cut, a slit and a groove, which is formed to extend in such a direction so as to divide the upper ceramic member in at least one portion of the outer surface thereof.

Thus, according to the present invention, since the upper ceramic member defining the divided combustion chamber is formed in its outer surface with at least one of a cut, a slit and a groove which extend over a predetermined length in a direction to at least partially divide the upper ceramic member, a tensile force is effectively relaxed, even if it is applied to a portion of the outer surface of the ceramics member of the divided combustion chamber as a result of the heating action from the inside as a result of the combustion of a fuel and the cooling action from the outside. That is, the presence of the predetermined cut, slit and/or groove formed in the outer surface prevents excessive tensile force to the outer surface, so that the upper ceramic member can be effetively protected from any crack and from any rupture, whereby the durability of the upper ceramic member is improved.

According to a preferred aspect of the present invention, moreover, the cut, slit and/or groove extending in the direction to at least partially divide the wall of the aforementioned ceramic member are (is) positioned to extend in a longitudinal direction of the divided combustion chamber, i.e., in a direction to cross the plane of the lower open face (joining surface) of the upper ceramic member (where it is jointed to the lower ceramic member) or, preferably, in a direction substantially normal to the above plane of the joining surface.

According to another preferred aspect of the present invention, the hemispherical head of the upper ceramic member has at least one through hole, which extends through its wall thickness from the outer surface thereof to the inside of the divided combustion chamber, e.g., a hole for mounting therein a glow plug or an injection nozzle, and the cut, slit and/or groove are (is) formed to extend from or in connection with the through hole.

According to still another preferred aspect of the present invention, the cut, slit and/or groove extending in a direction to at least partially divide the upper ceramic member are (is) positioned to extend in a transverse direction of the divided combustion chamber, i.e., generally in parallel with the plane of the lower open face (joining surface) of the upper ceramic member.

According to a further aspect of the present invention, the upper ceramic member, which cooperates with the lower ceramic member to form the divided combustion chamber therein, is formed with: (a) a first cut, and/or a first slit and/or a first groove which are (is) positioned to extend in the longitudinal direction of the divided combustion chamber; and (b) a second cut, and/or a second slit and/or a second groove which are (is) positioned to extend in the transverse direction of the divided combustion chamber, and the former first one or ones and the latter second one or ones are/is made in communication or connection with each other or separated from each other.

According to a further aspect of the present invention, together with or in place of the arrangement wherein the upper ceramic member is formed with the aforementioned cut, slit and/or groove, the lower ceramic member is formed with a cut, a slit and/or a groove, which are (is) positioned to extend a predetermined length in the transverse direction of the divided combustion chamber, i.e., generally in parallel with the plane of the open upper face of the lower cermamic member (where this member is jointed to the upper ceramic member), whereby the lower ceramic member is protected from any stress concentration, crack or rupture at its outer surface, in the same way as the aforementioned upper ceramic member.

Incidentally, the cut, slit and/or groove thus provided in the upper and/or lower ceramic members are (is) formed, according to the present invention, to extend along the whole circumferential length of the outer surface of either one or both of those ceramic members.

On the other hand, the upper and lower ceramic members to be used in the present invention to define the divided combustion chamber therein may be made of any of ceramic materials such as silicon nitride, silicon carbide, zirconia, zircon, mullite, cordierite, lithium-aluminum silicate, aluminum-titanate, magnesium-aluminum silicate, SIALON (i.e., silicon-aluminum oxynitride) or glass-ceramics, a composite of the foregoing ceramic materials, or another ceramic material. Moreover, the upper ceramic member forming the upper portion of the divided combustion chamber may preferably be made of a ceramic material having an especially excellent heat insulation such as glass-ceramics, zirconia or electrically insulating porcelain having a high strength, whereas the lower ceramic member forming the lower portion of the divided combustion chamber may preferably be made of a ceramic material having excellent resistance to heat and thermal shock.

BRIEF DESCRIPTION OF THE DRAWINGS

Other objects, features and advantages of the present invention will be described in the following in connection with the embodiments thereof with reference to the accompanying drawings, in which:

FIGS. 5 to 13 are top plan views showing a variety of examples of arrangement of cut, slit or groove formed in the upper ceramic member, respectively;

FIG. 14 is an elevational view in longitudinal section of the upper ceramic member having a groove according to another embodiment of the present invention;

FIG. 15 is a sectional view taken along line A—A of FIG. 14;

FIG. 16 is an exploded longitudinal sectional view showing the divided combustion chamber having a transverse cut according to a further embodiment of the present invention;

FIGS. 17 and 19 are views similar to FIG. 16 but show other embodiments of the upper ceramic member;

FIG. 18 is a front elevation showing a further embodiment of the upper ceramic member;

FIGS. 20 to 23 are views similar to FIG. 16 but show other embodiments of the lower ceramic member, respectively;

FIG. 24 is a view similar to FIG. 16 but shows a further embodiment of the upper ceramic member and the lower ceramic member;

FIG. 25 is a longitudinal sectional view showing another embodiment of the divided combustion chamber according to the present invention;

FIG. 26 is a side elevational view showing a further embodiment formed with longitudinal and transverse cuts according to the present invention;

FIG. 27 is a perspective view of the same; and

FIG. 28 is a perspective view showing a further embodiment of the upper ceramic member formed with two longitudinal cuts and one transverse cut according to the present invention.

DETAILED DESCRIPTION OF THE PREFERRED EMBODIMENTS

The present invention will be described in more detail with reference to the accompanying drawings.

Figure 1:
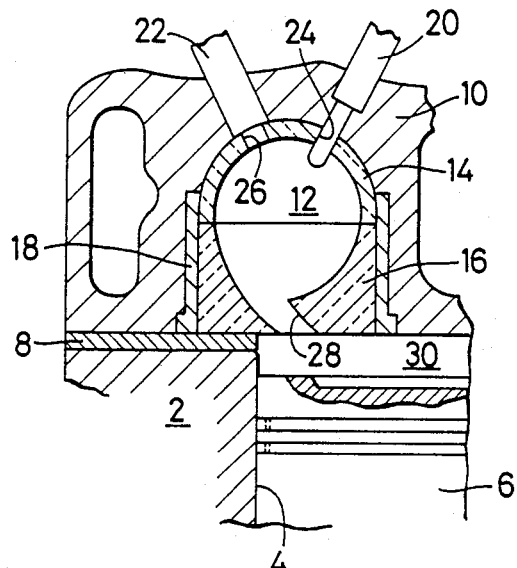
FIG. 1 is an elevational view in longitudinal section of a portion of a cylinder head, including a structure defining a divided combustion chamber.

First of all, FIG. 1 shows one embodiment of a structure defining divided combustion chamber of swirl type, which is wholly made of ceramic. Indicated at reference numeral 2 in FIG. 1 is a cylinder body of a Diesel engine, which has a cylinder bore 4 formed therein. A piston 6 is slidably fitted in the cylinder bore 4 to permit it to slide up and down, as viewed in FIG. 1. On the cylinder body 2, on the other hand, there is placed and mounted a cylinder head 10 through a gasket 8. Moreover, the cylinder head 10 is formed with a recess, in which is mounted an upper ceramic member 14 defining an upper chamber of a swirl chamber 12 and having its head or top formed generally into a hemispherical shape. In that recess, there is further fitted and mounted, through a metal ring insert 18, a cup 16 which is made of predetermined ceramic, i.e., a lower ceramic member 16. Thus, the upper and lower members 14 and 16 cooperate to form the divided predetermined swirl chamber 12 in the cylinder head 10.

The upper ceramic member 14 is formed in its head with through holes 24 and 26 for a glow plug 20 and an injection nozzle 22, respectively, which are mounted in said upper ceramic member 14 such that they extend through cylinder head 10 and through the holes 24 and 26. From the injection nozzle 22, a predetermined amount of fuel is injected into the swirl chamber 12, in which it is burned so that the resultant combustion swirl is introduced through a communication conduit 28 (i.e., an injection port), which is formed in the bottom of the lower ceramic member 16, into a main combustion chamber 30, which is defined by the piston 6 and the cylinder body 2. Furthermore, the upper ceramic member 14 partially defining the aforementioned swirl chamber 12 can be cracked, as has been described hereinbefore, so that it cannot enjoy a sufficient durability. However, this problem can be effectively solved by such countermeasures according to the present invention as will be described with reference to the remainder of the specification and Figures.

Figure 2:
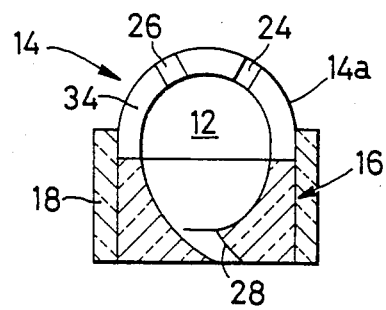
FIG. 2 is an elevational view in longitudinal section showing the structure of the divided combustion chamber having a longitudinal cut according to one embodiment of the present invention.
Figure 4:
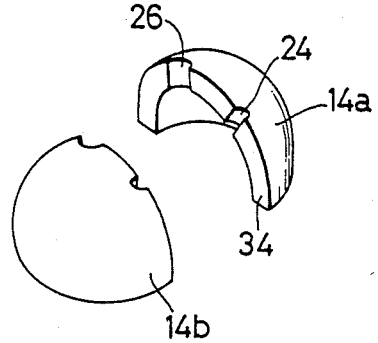
FIG. 4 is an exploded perspective view of the upper ceramic member of the same.
Figure 3:
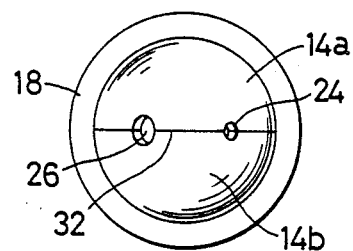
FIG. 3 is a top plan view of the same.

More specifically, FIG. 2 shows one embodiment of the present invention, in which the swirl chamber 12 similar to that of FIG. 1 is wholly made of ceramic. The upper ceramic member 14 is divided, as shown in FIGS. 3 and 4, into two halves 14a, 14b by a cut 34, indicated by a cutting or dividing line 32 which passes across the two through holes 24 and 26. The cut or dividing plane 34 which divides the upper ceramic member 14 into the two halves 14a, 14b, extends in a longitudinal direction of the swirl chamber 12, i.e., in a direction from the top to the bottom of the swirl chamber 12, and this sectional shape at the plane 34 is shown in FIG. 2.

By forming the cut 34 or cutting the upper ceramics member 14 in the plane 34, the tensile stress which is exerted upon the outer surface of that upper ceramic member 14, i.e., the surface at the side of the cylinder head 10, is effectively relaxed so that it is prevented from being ruptured by the resultant thermal stress, whereby its durability is improved.

Now, the portion and direction in which the upper ceramics member 14 is cut should not be limited to the above-exemplified position and direction, but may be located in other portions and formed in any longitudinal direction as long as the stress concentration can be obviated. It is further noted that the ceramic member 14 can be cut or divided into three or more components by a plurality of cutting or dividing planes. If necessary, the upper ceramic member 14 need not be completely divided, as shown in FIG. 4, but may be formed with a local or partial cut, i.e., a slit having a predetermined length over a portion of the outer surface of the ceramic member 14. In the presence of that slit, too, the aforementioned stress concentration can be effectively relaxed.

FIGS. 5 to 13 show examples of cutting or dividing the upper ceramic member 14 at a variety of its portions. Specifically, FIGS. 5 to 7 show embodiments in which the upper ceramic member 14 is cut or divided into three or four components by a plurality of cuts indicated by dividing lines 40, 42, 44, 46, 48 and 50. Further, FIGS. 8 to 12 show embodiments of slits 52, 54, 56, 58, 60 and 62 which are formed in the upper ceramic member 14 to act as partial cuts. Furthermore, FIG. 13 shows another embodiment in which the upper ceramic member 14 is cut or divided by the slits 52, and 62, 64 which are connected to each other through the through holes 24 and 26.

Incidentally, in case the upper ceramic member 14 is formed with the slits 52, 54, 60, 62 and so on, it cannot be free from a gap of some size, which is closed, if necessary, by filling it with a heat-resistant filler or by covering it with a heat-resistant cover.

However, the aforementioned cutting or dividing planes and slits may be effectively replaced by a predetermined groove which is formed in the upper ceramic member 14 to extend longitudinally thereof in at least one portion of the outer surface thereof. An embodiment of this modification is shown in FIGS. 14 and 15. In FIGS. 14 and 15, the upper ceramic member 14 is formed with a groove 66 which extends all over the semi-circular circumference of the outer surface thereof. In other words, the groove 66 is formed in a position similar to that of the cutting line 32 shown in FIG. 3. Due to the presence of the groove 66 which is formed in the outer surface of the upper ceramic member 14, which has a predetermined depth in the direction of wall thickness of the ceramic member, the stress concentration at the outer surface of the outer ceramic member 14 can be effectively relaxed, whereby the ceramic member 14 is protected from cracking and hence from its rupture, thereby enhancing its durability.

Furthermore, the depth of the groove 66 thus formed can be determined in accordance with the wall thickness of the ceramic member 14 such that it can effect its target stress relaxation. The bottom of the groove 66 may desirably be so rounded or enlarged as to prevent the stress concentration, as shown in FIG. 15.

The groove 66 need not be formed to extend over the entire circumference of the ceramic member 14, as exemplified in FIG. 14, and no difficulty arises even if the groove 66 is formed along a portion of the circumference, as in the aforementioned cutting or dividing planes or slits. Any pattern of the groove 66, in the modes exemplified in FIG. 5, etc., can be utilized.

Additionally, in the present invention, the aforementioned cut(s), slit(s) and/or groove(s) formed in the longitudinal direction of the upper ceramic member 14 can be effectively replaced by other cut(s), set(s) and/or groove(s) that is (are) formed transversely in said ceramic member 14. As a result, the transverse cut(s), slit(s) or groove(s) is (are) positioned to extend in a transverse direction of the divided combustion chamber such as the aforementioned swirl chamber, that is, in a direction substantially parallel to the plane of the joining surfaces of the upper and lower ceramic members. Those cut(s), slit(s) and/or groove(s) (are) formed in at least a portion of the outer surface of the ceramic member 14. FIGS. 16 to 25 show embodiments in which such transverse cut(s), slit(s) and/or groove(s) is (are) formed in the upper ceramic member 14 and/or the lower ceramic member 16.

In FIG. 16, each of the upper and lower ceramic members 14 and 16 cooperating to define the swirl chamber 12 is cut or divided into three components or parts by two cuts, indicated by dividing lines 33 and 33, which extend in planes parallel to the transverse direction of said swirl chamber 12. In other words, each of the upper and lower ceramic members 14 and 16 is composed of three parts, the transverse (or horizontal) abutting or joining faces of which provide the cuts or the cutting or dividing planes.

By means of the presence of the cuts 33 in such upper and lower ceramic members 14 and 16, the tensile stress, which might otherwise occur on outer surfaces of those upper and lower ceramic members 14 and 16, i.e., the surfaces of the same on the side of the cylinder head 10, are effectively relaxed, whereby the ceramic members 14 and 16 can be prevented to a satisfactory extent from being ruptured by the thermal stress, and their durabilities are highly improved.

On the other hand, together with or in place of the cuts 33, one or more transverse slits 35 having predetermined lengths, as shown in FIGS. 17 to 23, i.e., partial cuts can be formed in the upper ceramic member 14 and the lower ceramic member 16, respectively.

As stated above, in case the upper ceramic member 14 or the lower ceramics member 16 is formed with the slit or slits 35, these exists a gap of some size, which is closed, if necessary, by filling it with a heat-resistant filler or by covering it with a suitable heat-resistant cover.

Together with or instead of the cuts and slits, there may be formed circumferential grooves 36 which extend in the aforementioned transverse direction, as shown in FIGS. 24 and 25. In the embodiment shown in FIG. 25, the swirl chamber 12 is composed of a head ceramic member 80, a drum ceramic member 82 and a bottom ceramic member 84, which are formed with the circumferential grooves 36 extending in the transverse direction.

The depth or depths of those circumferential grooves 36 are determined in accordance with the wall thicknesses of the ceramic members 14, 16, 80, 82 and 84 that the desirable effect of relaxing the stress may be attained. The circumferential grooves 36 have their bottoms rounded or enlarged, as shown, to prevent stress concentration.

Furthermore, the grooves thus formed in the outer circumferences of the ceramic members need not be limited to the exemplified ones 36. The grooves may be shorter than the entire circumferential length, if the plural separate grooves are arrayed in spaced-apart relation in the circumferential direction, or if the grooves are helically formed in the outer circumferences of the ceramic members.

Incidentally, in the present invention, the upper ceramic member 14 may be formed with the aforementioned longitudinal cuts, slits and/or grooves and the aforementioned transverse cuts, slits and/or grooves either in a continuous fashion or in a separate and discrete fashion. For example, FIGS. 26 and 27 show one embodiment of continuous cuts. In this embodiment, the upper ceramic member 14 has its hemispherical head portion which is divided a longitudinal cut 68 and a transverse cut 70 which are normal to each other and cooperate to divide out a half of the hemispherical head portion. In another embodiment shown in FIG. 28, the hemispherical head portion of the ceramic member 14 is divided by a longitudinal cut 72 and the cuts 68, 70. These three cuts 68, 70, 72 cooperate to divide out a quarter of the hemispherical head portion. In any event, those transverse cuts, slits and/or grooves can effectively contribute to minimization of the concentration of the stress at the outer surfaces of the ceramic members, in cooperation with other longitudinal ones.

As has been described in detail hereinbefore in connection with the several embodiments, according to the present invention, the upper ceramic member partially defining the divided combustion chamber is formed with one or more longitudinal and/or transverse cuts, slits and/or grooves so that the thermal stress acting upon it can be effectively relaxed, whereby the resistance of the ceramic member to rupture can be augmented to improve remarkedly the durability of the divided combustion chamber made of ceramic.

The description thus far is directed mainly to the ceramic member or members which form the swirl chamber, i.e., a divided combustion chamber. However, the principle of the present invention is applied to a structure to define a divided combustion chamber of another type, e.g., a pre-combustion chamber. It goes without saying that the present invention can be suitably applied even to the case in which the ceramic members are used in that pre-combustion chamber.

Moreover, the present invention can also be effectively applied in the case where the upper ceramic member is composed of two or more ceramic parts or components such as the head ceramic member and the drum ceramic member. Suitable known outer ring or positioning means may be used for inserting the ceramic member or members in the cylinder head. Such ring or positioning means may be formed with the cut or cuts, slit or slits and/or groove or grooves according to the present invention. Moreover, it is possible, if necessary, to use a heat insulating layer or a heat insulating material layer, especially, between the ceramic member and the cylinder head.

Further, it is quite obvious that a variety of modifications, improvements and corrections can be made in the present invention without departing from the spirit of the present invention, and that the present invention may be embodied so as to incorporate those modifications.

What is claimed is:

1. A structure defining a divided combustion chamber of a Diesel engine, comprising: an upper ceramic member having a substantially hemispherical head with a substantially hemispherical inner and outer surface and a lower ceramic member with an inner and an outer surface and having an injection port, said lower ceramic member cooperating with the upper ceramic member to form an inner and outer surface of the divided combustion chamber, said upper ceramic member including at least one through hole extending from the outer surface thereof to the inner surface of said divided combustion chamber, at least said upper ceramic member including at least one groove formed on at least the outer surface of the divided combustion chamber, said at least one groove having a rounded bottom extending in at least said upper ceramic member, thereby mitigating thermal stresses in the divided combustion chamber.

2. A structure according to claim 1, wherein said at least one groove extends around a peripheral portion of said upper ceramic member only.

3. A structure according to claim 1, wherein said at least one groove occurs in both said upper and lower lower ceramic members.

4. A structure according to claim 3, wherein said groove extends around an outer peripheral portion of both said upper and lower ceramic members.

5. A structure defining a divided combustion chamber of a Diesel engine, comprising: an upper ceramic member having a substantially hemispherical head with a substantially hemispherical inner and outer surface and a lower ceramic member with an inner and an outer surface and having an injection port, said lower ceramic member meeting with the upper ceramic member at an interface to form an inner and outer surface of the divided combustion chamber, said upper ceramic member including at least one through hole extending from the outer surface thereof to the inner surface of said divided combustion chamber, at least said upper ceramic member including at least one structural feature selected from the group consisting of a slit and a cut formed in a straight plane on at least said outer surface of the divided combustion chamber and said straight plane extending in a plane parallel to said interface, thereby mitigating thermal stresses in the divided combustion chamber.

6. A structure according to claim 5, wherein said at least one structural feature is located in said upper ceramic member only.

7. A structure according to claim 5, wherein said at least one structural feature is located in both said upper and lower ceramic members.

* * * * *